United States Patent [19]

Kodaira

[11] Patent Number: 5,066,971
[45] Date of Patent: Nov. 19, 1991

[54] CAMERA

[75] Inventor: Takanori Kodaira, Tokyo, Japan

[73] Assignee: Canon Kabushiki Kaisha, Tokyo, Japan

[21] Appl. No.: 298,315

[22] Filed: Jan. 17, 1989

Related U.S. Application Data

[63] Continuation of Ser. No. 222,388, Jul. 21, 1988, abandoned, which is a continuation of Ser. No. 105,016, Oct. 6, 1987, abandoned.

[30] Foreign Application Priority Data

| Oct. 9, 1986 | [JP] | Japan | 61-240836 |
| Oct. 9, 1986 | [JP] | Japan | 61-240837 |
| Oct. 9, 1986 | [JP] | Japan | 61-240838 |
| Oct. 9, 1986 | [JP] | Japan | 61-240839 |

[51] Int. Cl.⁵ .......... G03B 17/18; G03B 1/00; G03B 13/02
[52] U.S. Cl. .................. 354/465; 354/159; 354/213; 354/222
[58] Field of Search ............ 354/159, 221, 222, 173.1, 354/173.11, 212, 213, 465, 471, 206, 210, 419, 106

[56] References Cited

U.S. PATENT DOCUMENTS

| 4,384,774 | 5/1983 | Tuck | 354/159 |
| 4,436,399 | 3/1984 | Koch et al. | 354/159 |
| 4,557,591 | 12/1985 | Serizawa et al. | 354/159 X |
| 4,611,895 | 9/1986 | Seely | 354/159 |
| 4,652,104 | 3/1987 | Harvey | 354/106 |
| 4,716,427 | 12/1987 | Shyu | 354/159 |
| 4,843,418 | 6/1989 | Taniguchi et al. | 354/106 X |

Primary Examiner—W. B. Perkey
Attorney, Agent, or Firm—Fitzpatrick, Cella, Harper & Scinto

[57] ABSTRACT

A camera has a changeable picture frame forming means for changing the picture frame size and features the prohibition of actuating the changeable picture frame forming means during the use of one and the same roll of film.

7 Claims, 8 Drawing Sheets

CAMERA

This application is a continuation of application U.S. application Ser. No. 222,388 filed July 21, 1988, now abandoned, which is a continuation of U.S. application Ser. No. 105,016 filed Oct. 6, 1987 which is abandoned.

BACKGROUND OF THE INVENTION

1. Field of the Invention

This invention relates to cameras, and more particularly to cameras capble of altering the size of the area of the picture frame.

2. Description of the Related Art

A camera using roll film of 35 mm wide which is able to take negatives in a picture frame of the 24 mm×25 mm is generally called a "35 mm" or "full-size" camera. There is also a well known "half-size" camera whose picture frame, although using roll film of the same size, is sized to 24 mm×17.5 mm.

In the past, the non-interchange-lens type of full-size camera (or compact camera) and the half-size camera were manufactured as thoroughly independent articles of each other. Therefore, the camera user who wanted to make photographs of the full-size and half-size formats was obliged to carry both the full-size and half-size cameras.

On this account, to obviate such trouble, a camera capable of shooting both the full-size and half-size formats selectively was not available in the market. There has also been previous proposals for imparting into such a changeable format camera, a capability of selectively setting two viewfinder frames for both the full-size and half-size formats in automatic response to a changeover between these formats, as, for example, in Japanese Patent Publication No. Sho 60-57577.

In the ever sold camera of the type described, however, no automatic means was provided for adjusting the size of the area of the viewfinder frame in accordance with the altered size of the area of the picture frame. After he had changed the picture frame from the full size to the half size, the photographer, before shooting, often forgot to set the viewfinder frame off for the half-size format. As a result, there was a drawback that a high percentage of the photographs taken which would be different in composition from what the photographer intended to make was high.

According to the above-mentioned proposal for a camera in which the viewfinder frame size is changed in automatic response to a change of the picture frame size, on the other hand, there is no possibility of erroneous framing when taking shots after the picture frame has been changed from the full size to the half size But, to rely only on this proposal is makes it difficult for the 2-format changeover type camera to attain its full usefulness.

To realize a changeable format camera of high usefulness, the following factors must generally be taken into account in its design. But, prior known cameras by the aforesaid proposal are not designed as such The employment of the capability of changing over the picture frame between two sizes in the camera whose photographic lens and finder have no common optical path makes troublesome the parallax adjustment when the camera is manufactured. The aforesaid proposal, has, however, been applied to this camera ignoring such a problem.

For the coexistence of frames of different size in one roll film, the film developing laboratory system up to the present time cannot cope yet with such a film in the automatic printing treatment and others. It will, therefore, very much hamper such treatment. This situation is not considered in the aforesaid proposal.

The impartment of the format changeability into the camera produces a problem that the adjacent two frames of different size are caused to partly overlap each other as with the change of the picture frame from the half to the full size. The camera of the aforesaid proposal is not provided with means for eliminating that problem.

When shooting frames of smaller or half size, the image sharpness becomes more susceptible to camera-shake than when shooting frames of larger or full size. The prior known cameras suffer this problem.

SUMMARY OF THE INVENTION

An object of the present invention is to provide a camera capable of changing the picture frame size which overcomes all the above-described problems of the convenational cameras.

To achieve this, according to the invention, the camera is provided with changeable format forming means for defining a picture frame of changeable size, a finder device, changeable viewfinder frame forming means constituting a unit together with the finder device to change the field of view of the finder device in automatic response to operation of the changeable picture frame forming means, and fastener means for fixedly securing the unit to the camera body in an adjusted position, whereby the parallax of the changeable format camera can be easily and quickly adjusted when it is manufactured.

Further, to achieve the above-described object, the invention provides for the changeable format forming means for changing the size of a picture frame with means for prohibiting the size of the picture frame from being changed by the changeable format forming means during the use of film so that coexistence of frames of different size occurs in one roll of film. Thus, even the changeable format camera is made to cope with the film developing laboratory system of the present time.

Furthermore, to achieve the above-described object, according to the invention, the camera is provided with changeable format forming means for changing the picture frame size, detecting means for detecting the frame size set by the changeable format forming means, and film feed amount determining means responsive to the output of the detecting means for determining the amount of fed film by one frame, and responsive to inoperation of the detecting means for setting the amount of fed film to a value for the larger frame size regardless of the preset frame size. In the camera capable of changing the picture frame size, when the detecting means has become inoperative, the amount of fed film by one frame is made for the larger frame size, whereby the film is prevented from being partly double exposed.

Further, to achieve the above-described object, according to the invention, the camera is provided with changeable format forming means for changing the picture frame size, warning value changing means for changing the camera-shake warning value in response to the frame size set by the changeable format forming means, so that the camera-shake warning value is caused to change depending on the picture frame size Thereby, even with the camera capable of changing the picture frame size, a proper camera-shake warning can be performed to suit to the frame size.

Other objects of the invention will become apparent from the following description of an embodiment thereof.

DETAILED DESCRIPTION OF THE PREFERRED EMBODIMENTS

An embodiment of the invention is described by reference to the drawings.

FIGS. 1 to 4 and 6 illustrate the structure of a changeable format and viewfinder frame forming device which is important in the camera of the invention, and its operative positions. This changeable format and viewfinder frame forming device, as will be described more fully later, comprises changeable format forming means 50 for changing the size of the picture frame and changeable viewfinder frame forming means 60 for changing the size of the viewfield of the finder (the size of transparent area of the finder), and both means are made to cooperate with each other. It should be noted in the illustrated embodiment, the device can take only two value of the picture frame size, namely, a large size (full size) and a small size (half size) selectively.

Figure 1:
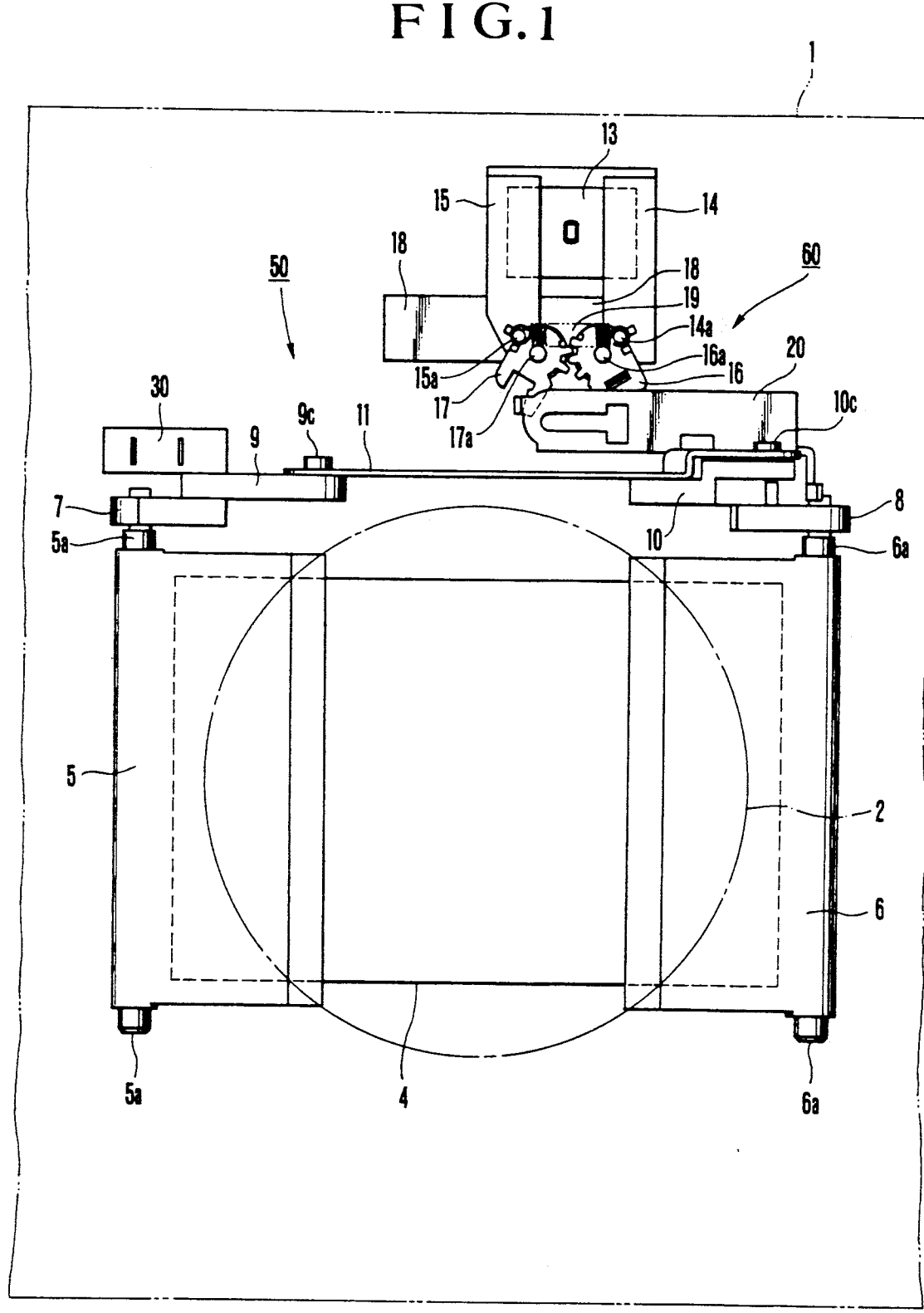
FIG. 1 is a front elevational view of the main parts of an embodiment of a camera according to the invention with the picture frame set in a small size
Figure 2:
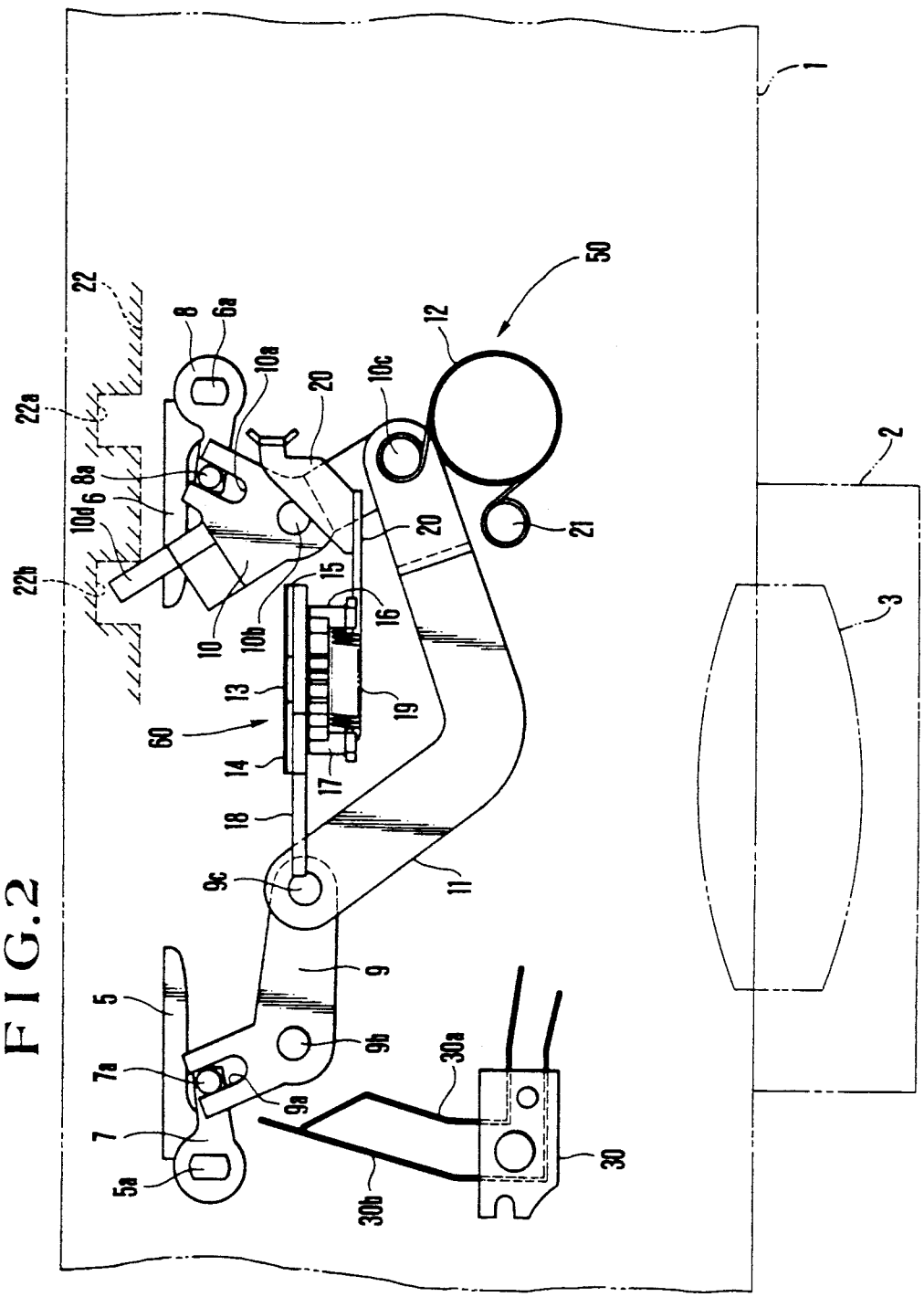
FIG. 2 is a top view of the camera of FIG. 1.
Figure 3:
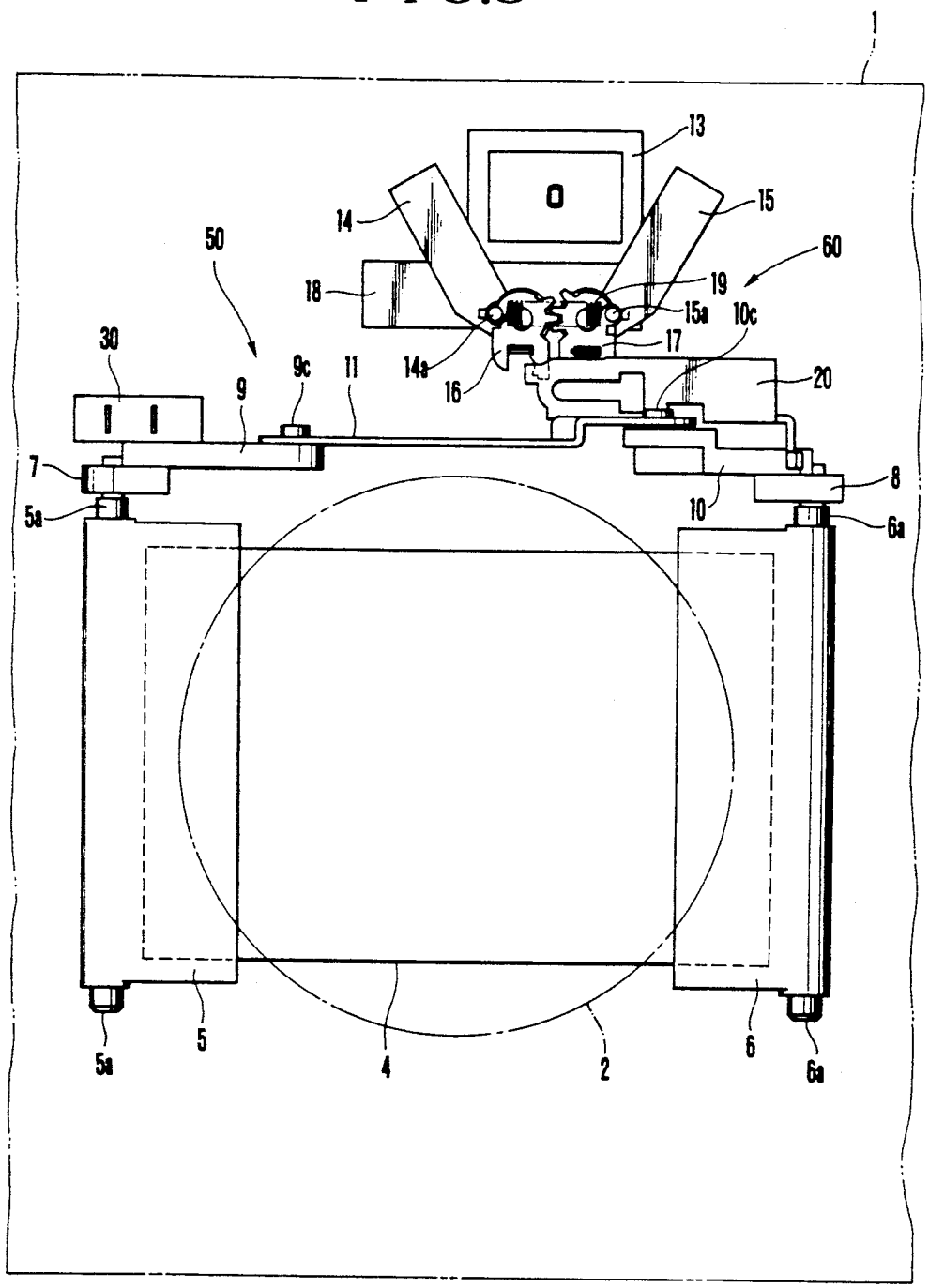
FIG. 3 is similar to FIG. 1 except that the picture frame is set to a large size.
Figure 4:
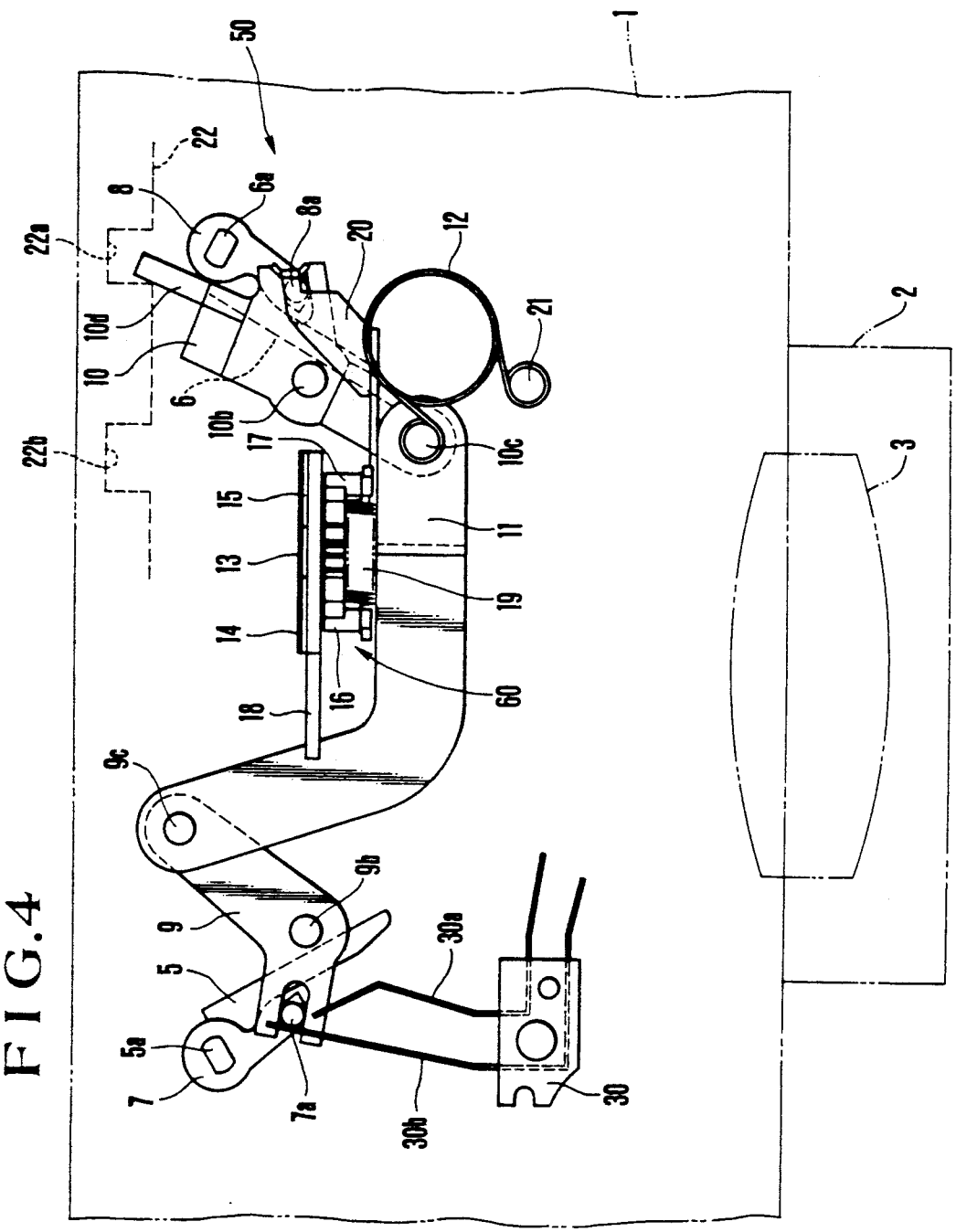
FIG. 4 is a top view of the camera of FIG. 3.
Figure 5:
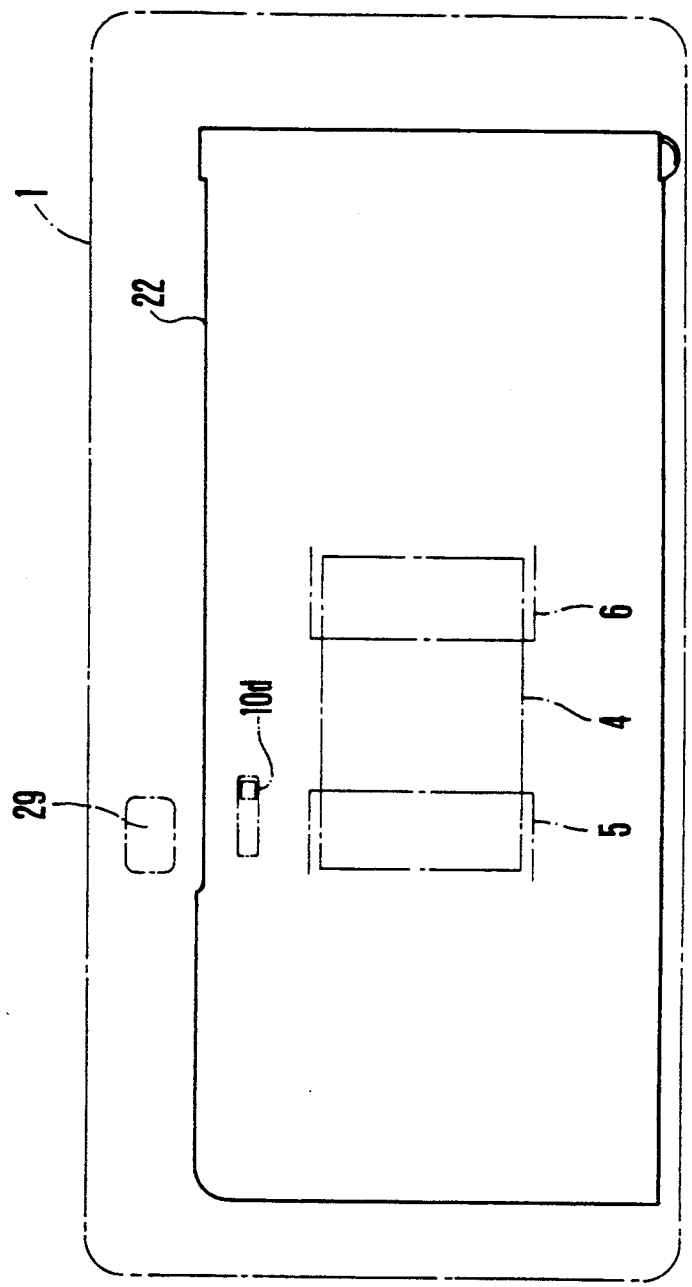
FIG. 5 is a schematic back elevational view of the camera shown in FIGS. 1 to 4.
Figure 6:
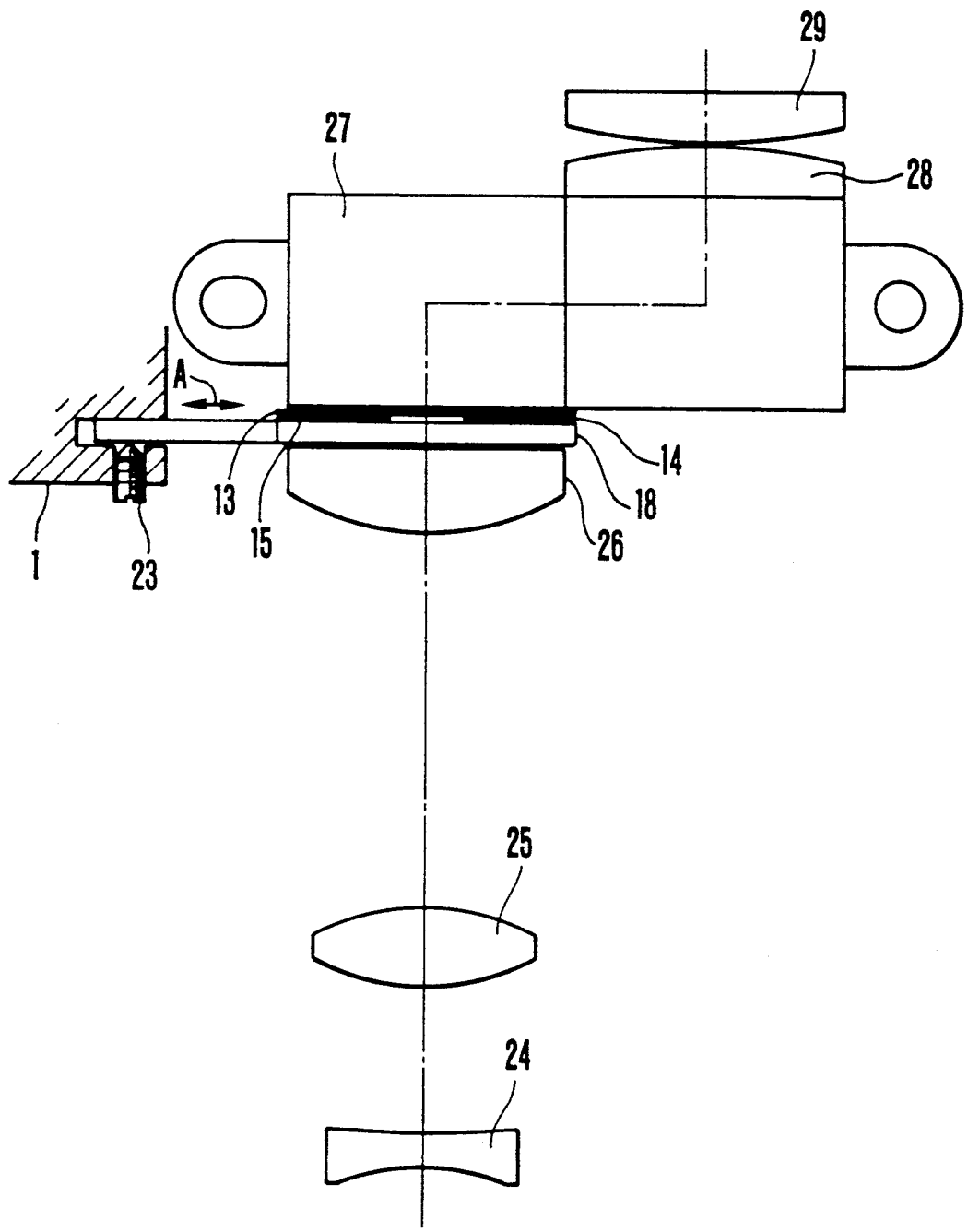
FIG. 6 is a plan view of the rough structure of the finder device of the camera shown in FIGS. 1 to 5.

FIG. 1 illustrates the camera of this embodiment with the picture frame and viewfinder frame (the lookingthrough area of the finder) both set for the small size (or half size) as viewed from the front of the camera. Also, FIG. 2 is a plan view looked at from above the parts of the camera shown in FIG. 1. FIG. 3 is a front elevational view of the picture frame and the viewfinder frame formed to the large or full size. FIG. 4 is a plan view of FIG. 3. FIG. 5 is a back view looked at from the rear of the camera. FIG. 6 is a view illustrating the outline of the structure of the finder device of the camera of this embodiment.

In FIGS. 1 to 4, a camera body 1 has a lens barrel 2 in front thereof. The lens barrel 2 contains a photographic lens 3. An aperture 4 is formed within the camera body 1, by which a picture frame is defined.

A pair of aperture screen boards 5 and 6 (changeable picture frame forming members) shielding the side margins of the aperture 4 are arranged just in front of the aperture 4. The aperture screen boards 5 and 6 have vertical pins 5a and 6a supported on the camera body 1, and are supported within the camera body 1 to be pivotal about the pins 5a and 6a. The aperture screen boards 5 and 6 have a function of setting the picture frame to either one of the full size (24×35 mm) and the half size (24×17.5 mm) and, when in the position of FIG. 1, sets it at the half size, and when in the position of FIG. 3, at the full size.

Driven levers 7 and 8 are fixedly mounted at their bases on the top ends of the pins 5a and 6a and pivotal about the axes of the pins 5a and 6a in unified relation with the aperture screen boards 5 and 6. Pins (or bolts) 7a and 8a are mounted on the upper surfaces of the free end portions of the driven levers 7 and 8. The pin 7a is relatively slidably inserted into a slot 9a of one end of a first intermediate lever 9, while the pin 8a is relatively slidably inserted into a slot 10a formed in a drive lever 10. The first intermediate lever 9 is in the form of a bell crank pivotally supported about a pin 9b on the camera body 1, and has the slot 9a in one end, and a pin 9c on the other about which is pivotally mountedon one end of a second intermediate lever 11.

The drive lever 10 has a pin 10b parallel to the pin 6a and is supported on the camera body 1 to be pivotal about the pin 10b. The lever 10 has the aforesaid slot 10a and a pin 10c about which is pivotally mounted the other end of the second intermediate lever 11. Also, the drive lever 10 is provided with a knob 10d (frame size setting member) which is operated by the finger of the photographer. This knob 10d is arranged inside a back cover 22 of the camera to be accessible only when the back cover 22 is opened (see FIG. 5).

To lock (or restrain) the knob 10d, two recessed portions (restraining portions) 22a and 22b (see FIGS. 2 and 4) are formed in the inner surface of the back cover 22. Therefore, after the knob 10d has been placed in registry with either the position shown in FIG. 2 or the position shown in FIG. 4, when the back cover 22 is closed, the knob 10d enters the corresponding one of the recessed portions 22a and 22b and are locked. For note, in FIG. 5, 29 is an eyepiece of the finder.

One end of the second intermediate lever 11 is pivotally mounted about a pin 9c fixedly mounted on the first intermediate lever 9, and the other end of the second intermediate lever 11 is pivotally mounted about the pin 10c fixedly mounted on the drive lever 10. One end of a toggle spring 12 is connected to the pin 10c, and the other end of the toggle spring 12 is connected to a fixed pin 21 extending from the camera body 1. The toggle spring 12, as is well known, reverses the direction of the sustaining force at an intermediate position of action. So, the second intermediate lever 11 is sustained stable in either of the positions of FIGS. 2 and 4.

The above-described parts, namely, the aperture screen boards 5 and 6, the driven levers 7 and 8, the first intermediate lever 9, the drive lever 10, the knob 10d, the second intermediate lever 11 and the toggle spring 12, constitute the changeable format forming means 50.

Next, the structure of the changeable viewfinder frame forming means 60 which is operatively connected to the changeable format forming means 50 is described below.

In FIGS. 1 to 4, a finder mask 13 cooperates with a pair of mask screen boards (changeable viewfinder frame forming members) 14 and 15 capable of shielding the side margins of the finder mask 13. Drive levers 16 and 17 for the mask screen boards 14 and 15 respectively are operatively connected to each other at their geared respectively. The lower ends of the mask screen boards 14 and 15 are fixed to the shafts 16a and 17a respectively so that the mask screen boards 14 and 15 can rotate along with their respective shafts 16a and 17a. The shafts 16a and 17a are rotatably supported on a mask holder 18 of tangular shape. The finder mask 13 is also mounted on the mask holder 18. A spring 19 is connected at its ends to pins 14a and 15a, respectively, on the lower end portions of the mask screen boards 14 and 15, urging the mask screen boards 14 and 15 in a direction so as to approach each other.

A drive connection member 20 engages one end of the drive lever 17 and extends toward the driven lever 8 (see FIG. 1), so that one portion of the drive connection member 20 is engageable with a pin 8a of the driven lever 8. That is, this drive connection member 20 transmits movement of the driven lever 8 (in other words, the set value by the changeable format forming means 50) to the finder mask screen boards 14 and 15 and makes the aperture screen boards 5 and 6 coordinate with the finder mask screen boards 14 and 15.

All the above-described parts except the drive connection member 20 constitute the changeable viewfinder frame forming means 60. This means 60 is, as shown in FIG. 6, unified through the mask holder 18 to the body of the finder device (that is, the optical system including a porro-prism). Therefore, when a parallax adjustment for the full size shot is performed by mounting the mask holder 18 on the camera body 1 while adjusting the position to be fixed, another parallax adjustment for the half size shot is also performed at once FIG. 6 illustrates the changeable viewfinder frame forming means unified with the finder device body. In this embodiment, the camera is made up by putting the changeable viewfinder frame forming means 50 on the mask holder 18 together with the finder mask 13, and then the mask holder 18 on the camera body 1 in such a relation that the fixed position by a screw fastener 23 is adjustable (in other words, after the position of the mask holder 18 has been determined by moving it in the direction of arrow A and in the direction perpendicular to the paper as viewed in FIG. 6). Also, the mask holder 18 is also fixed to the body of the finder device including the porro-prism 27, thus constituting a unit of the changeable viewfinder frame forming means and the finder device body in fixedly secured relation. Therefore, when the mask holder 18 is mounted to the camera body 1, the finder device body also is located on the camera body. Hence, the above-described two parallax adjusting operations can be performed at once.

It should be noted, in FIG. 6, 24 and 25 denote an objective lens of the finder optical system, 26 denotes a field lens of the same finder optical system, and 28 and 29 denote an eyepiece.

A switch 30 is arranged adjacent the first intermediate lever 9 to detect the set value of the frame size. This switch 30 has two contacts 30a and 30b, constituting a normally closed switch, as shown in FIG. 2, and is connected to a control circuit in the the camera body 1 so that the frame size setting result is inputted to the control circuit FIG. 7 illustrates the outline of an electrical device related to the changing of the frame size in the camera of the invention.

Figure 7:
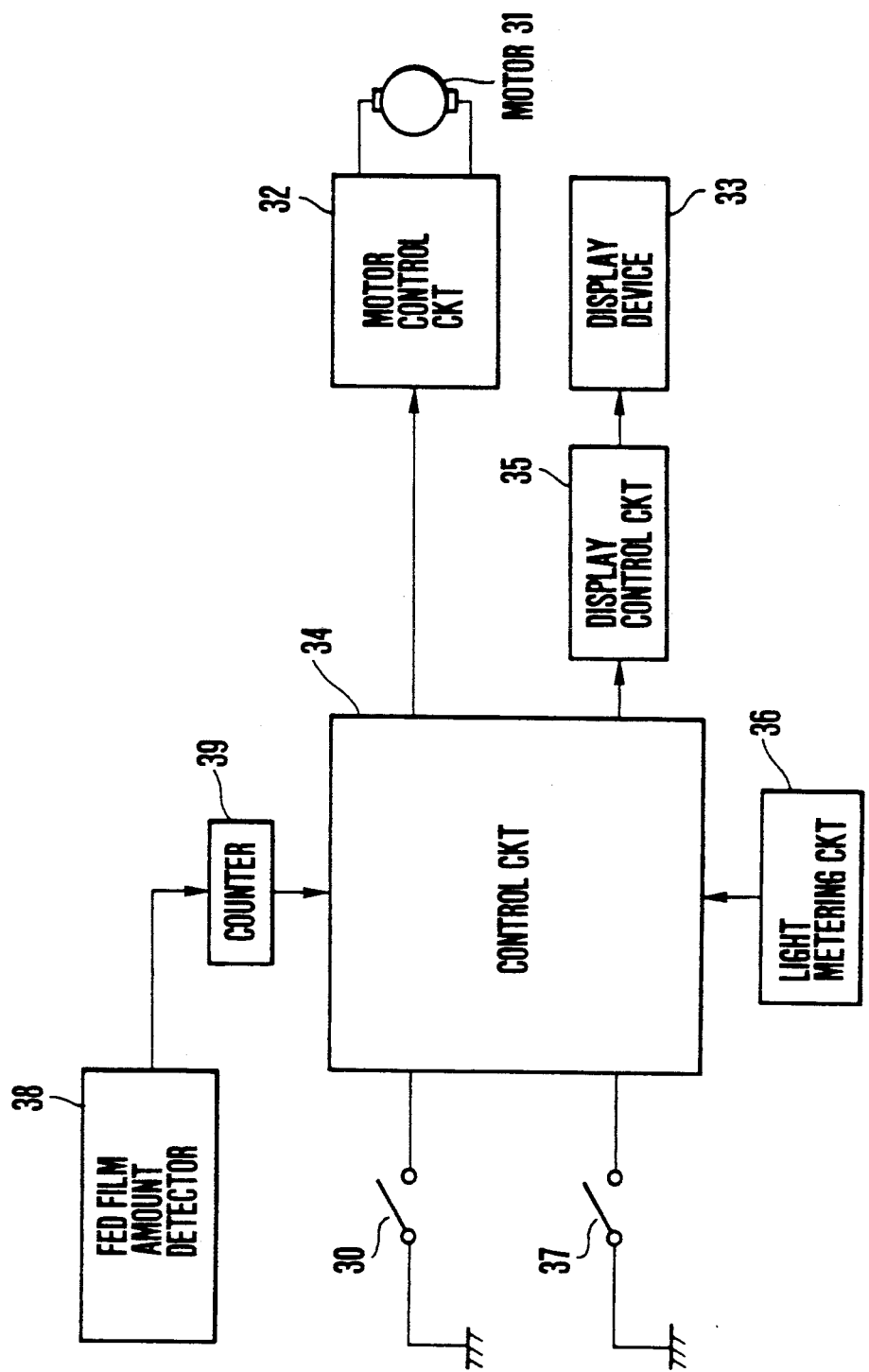
FIG. 7 is a diagram schematically illustrating the structure of electrical control means in the camera shown in FIGS. 1 to 6.

In FIG. 7, an electric motor 31 for winding up or rewinding film is installed within the camera body 1. Current supply to the motor 31 is controlled by a motor control circuit 32. A display device 33 presents a display within the finder. A control; circuit 34 includes a microcomputer mounted within the camera body 1, and functions as means for setting the amount of fed film and means for detecting camera-shake. The display device 33 is controlled by a display control circuit 35. Display device 36 is known light metering circuit. A switch 37 detects when an exposure is complete. The set frame size detecting switch of FIGS. 1 to 4 is indicated at 30. A fed film amount detector 38 detects the amount of fed film in the form of pulses through a sprocket driven to rotate in engagement with the perforations of the film. 39 is a counter.

Figure 8:
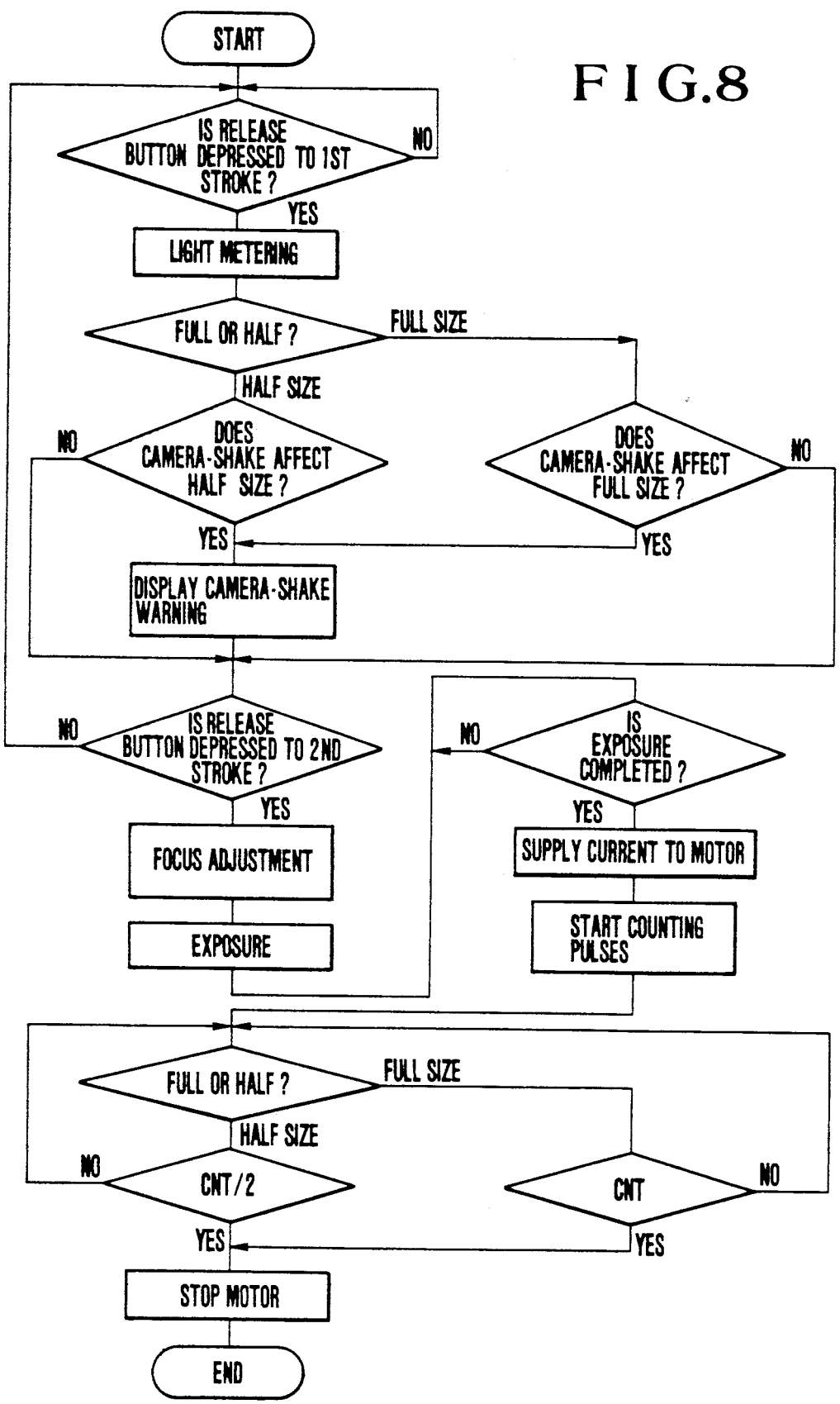
FIG. 8 is a flowchart for the control sequence of operations of the control circuit of FIG. 7 in the camera having the structure shown in FIGS. 1 to 7.

FIG. 8 is a flowchart illustrating a sequence of control instructions to be executed in the control circuit 34. It should be noted that in FIG. 8, CNT stands for "count".

The operations of the various portions of the camera of such construction as described above are described by reference to FIGS. 1 to 8.

(i) For photogrpahs of the half-size format.

Assuming that before the camera of this embodiment is set to the half-size format shooting position, the camera has been set in the full-size format shooting position, the various members in the camera take their postiions shown in FIGS. 3 and 4.

To switch the camera from the position shown in FIGS. 3 and 4 to a position suited for making photographs of the half-size format, the following operation is carried out.

Prior to making of an exposure, the camera user opens the back cover 22 to access the knob 10d of the drive lever 10 and then moves the knob 10d to the left as shown in FIG. 2 with his finger, and then closes the back cover 22, thereupon the knob 10d is locked in engagement with the other recessed portion 22d of the back cover 22. Therefore, he can no longer touch the knob 10d again until the back cover 22 is opened. Thus, pictures of different sizes are prevented from coexisting in one roll of film.

Such leftward movement of the knob 10d causes counter-clockwise movement of the drive lever 10 about the pin 10b, so that the second intermediate lever 11 pivotally mounted on the pin 10c is pulled to the right and as the pin 11c overcomes the bias force of the toggle spring 12, it also is moved to the right. Also, through the pin 8a engaging in the slot 10a of the drive lever 10, the driven lever 8 is causes to turn about its center of rotation (or pin 6a), thereby the aperture screen board 6 unified with the driven lever 8 and is turned about the pin 6a from the position shown by dashed lines in FIG. 4 to a position shwon in FIG. 2.

Also, a rightward force is applied from the pin 10c to the right end of the second intermediate lever 11, and the pin 9c rotates about the pin 9b in the clockwise direction, thereby the first intermediate lever 9 also is turned in the same direction. Therefore, through the pin 7a, the driven lever 7 is turned about the pin 5a in the counter-clockwise direction. Thus, the other aperture screen board 5 is also turned in the counter-clockwise direction.

Meanwhile, because, as has been described above, the pin 10c moves from the position of FIG. 4 to the right to turn the drive lever 10 about the pin 10b in the counter-clockwise direction and the driven lever 8 in the clockwise direction, the drive connection member 20 engaging with the pin 8a of the driven lever 8 is moved to the left and the drive lever 17 for the finder mechanism is turned about the shaft 17a by the force of the spring 19 from the position of FIG. 3 to follow up the drive connection member 20. As a result, the finder mask screen board 15 is turned about the shaft 17a in the clockwise direction. Also, the driv elever 16 is caused to tutn in the counter-clockwise direction so that the other finder mask screen board 14 is turned about the shaft 16a in the counter-clockwise direction.

In the first half of the course of movement of the drive lever 10 from the position of FIG. 4 to the position of FIG. 2, the toggle spring 12 gives the drive lever 10 a force of the opposite direction to that of the force received from the drive lever 10 and is charged with power. But, when it reaches nearly the center of the aforesaid course, the attitude of the toggle spring 12 changes as shown in FIG. 2, and, at the same time, the toggle spring 12 starts to exert a force of turning the drive lever 10 in the counterclockwise direction. Then, the lever 10 rapidly reaches the position of FIG. 2.

When the drive lever 10 has reached the position of FIG. 2, the aperture screen boards 5 and 6 are set in their positions shown in FIG. 1 and 2, and the finder mask screen boards 14 and 15 also are set in the positions of FIG. 1.

Therefore, both side marginal portions of the aperture 4 are more largely shielded by the screen boards 5 and 6 than when in the positions of FIG. 3 so that the size of the opening of the aperture becomes smaller than when in the position of FIG. 3 (that is, the picture frame is changed to the half-size). Thus, it becomes possible to take half-size shots. In this case not only the lateral length of the aperture (that is, the size of the picture frame) is decreased to one half, but also the lateral length of the open area of the viewfield of the finder is decreased to one half, thus letting the photographer know which format is in operation when he looks through the finder (or preventing him from mistaking the actual picture frame of the half-size for the full-size as the latter would appear in the finder).

It should be noted that when the switch 30 is in the position of FIG. 4 (or the full-size position), it had its contacts 30a and 30b separated from each other by the pin 7a. In the position of FIG. 2(or the half-size position), on the other hand, the contacts 30a and 30b are brought into engagement with each other.

In the position of FIG. 2 (where the contacts 30a and 30b are in contact with each other), the switch 30 of FIG. 7 is closed to produce a signal representing that the picture frame has been set in the half-size which is applied to the control circuit 34. Responsive to this, the control circuit 34 changes the mode of operation of the motor control circuit 32 so that the distance the film is moved after each shot is changed to suit to the half-size format, and alters the critical light level at which an alert to camera-shake is signaled on the display device 33 in the finder to a value suitable for the half-size format.

Here, the reason why the critical light level should be changed depending on the size of the picture frame is briefly explained.

The critical shutter speed to camera-shake may be reckoned by the formula: 1/f in sec. wheer f is the focal length in mm), as is generally shwon. For a 60 mm lens, when shooting the camera of the full-size format, the critical time toc amera-shake must be taken at 1/60 sec. This implies that an image blur resulting from the use of not slower than 1/60 sec. in the shutter speed is not perceived in a print of that service size which the photo shops commonly offer.

By the way, the photographers generally have a passion for obtaining even from the negatives of the half-size format photographgs of the same size as those for the full-size format. Also since the developing laboratory, too, makes the service size of prints from the negatives of the half-size format equal to that of prints from the full-size format negatives, because the magnitude of enlargement is larger when from the half-size than from the full-size, the larger the magnitude of enlargement, the more the image blur is perceptible. Accordingly, in the case of shots of the half-size format, the critical shutter speed to camera-shake has to be set to a faster value than when shots of the full-size format are taken. Suppose the camera having, for example, the 60 mm lens is used to take full-size and half-size negatives which are then enlarged by different magnifications from ech other to obtain prints of the same size, the apparent focal length for the half-size format print becomes 80 mm.

For the shot of the half-size format, therefore, an alert to camera-shake must be signaled at 1/80 sec. or slower.

As has been described above, after the knob 10d has been operated to change the picture frame from the full-size to the half-size, the back cover 22 is closed. The photographer then pushes down a release button (not shown) to start a camera release.

When the release button reaches the first stroke, the cotnrol circuit 34 starts to operate with execution of the control instructions according to the flowchart shown in FIG. 8. So, the light metering circuit 36 evaluates an object brightness level. From this is derived an exposure value, i.e., a value of shutter speed. Whether this value is above or below the critical level to camera-shake is determined. If it falls in a range for camera-shake, then the display control circuit 35 operates the display device 33 so that an alert to camera-shake is displayed within the finder. This determination is made based onthe value suited to the half-size format by the output of the closed switch 30 as has been described above. When the release button is further pushed down to the second stroke, automatic focus adjustment is performed and an exposure is initiated. At the termination of the exposure (or the end of the shot), the exposure completion witch 37 shown in FIG. 7 is closed. Then, the motor 31 is energized to drive rotation of a film takeup spool (not shown) in a winding-up direction, by which a film winding operation is initiated. When the film winding operation goes on (or the film moves within the camera), the fed film amount detector 38 produces a pulse signal representing the amount of fed film which is applied to the counter 39. The counter 39 produces a signal representing the corresponding film length to the signal produced from the detector 38, which is applied to the control circuit 34. In this case, because the switch 30 is closed (or the picture frame is set in the half-size), when its input signal from the detector 38 has reached the corresponding value to the half-size, the control circuit 34 produces a signal for stopping the motor 31 which is applied to the motor control circuit 32. Therefore, when the amount of fed film reaches the corresponding value to the half-size, the current supply to the motor 31 is cut off and the motor 31 is stopped.

Hence, the film is advanced through the corresponding length to the one frame of the half-size.

(ii) For shots of the full-size:

After the back cover 22 is opened, the knob 10d is moved from the position of FIG. 2 to the position of FIG. 4. Then, the back cover 22 is closed to lock the knob 10d in the recessed portion 22a of the back cover 22.

During the movement of the knob 10d from the position of FIG. 2 to the position of FIG. 4, the various ones of the parts which are related to the drive lever 10 are moved in the reverse direction to that described in connection with the operation described in section (i) hereinabove. So, their explanation is omitted here.

In the position of FIG. 4 (or when full-size shots are taken), the swich 30 is in the open (off) state. Responsive to opening of the switch 30, the circuit of FIG. 7 operates in a corresponding manner to the full-size shot. This manner, as illustrated in FIG. 8, differs from that for the half-size only in that the critical level for the alert to camera-shake and the value to be counted in the amount of fed film in the control circuit 34 are altered to suit to the full-size shot in response to opening of the switch 30. The other operations are similar to those described in connection with the half-size shot in the first chapter (i) and their explanation is omitted here.

It should be pointed out that the switch 30 is made to open for the full-size shot. Therefore, if it happens that the switch 30 does not work normally due to the fialure of good electrical connection between its contacts (or the switch 30 becomes unable to turn on), the amount of fed film is made to correspond to the full-size frame regardless of which format the camera has been set in (or the film is advanced through the length of the full-size frame for each shot). Hence there is no possibility of advancing the film through the length of the half-size frame despite the full-size shot has been taken. Thus, it is made possible to prevent the exposed areas of the film from being exposed again or an accident of double exposure from occurring.

Though, in the foregoing embodiment, the changeable format and viewfinder frame forming members for changing the sizes of opening of the exposure aperture and the finder mask are constructed in the form of the pivotal type screen boards, it is to be understood that the present invention is not confined thereto. Both members may otherwise be formed to the slidable type of screen boards, or non-mechanical types of sreen means such as polarizing filter type, liquid crystal shutter type and PLZT (lead lanthanum zirconate titanate) type, or any other types. Also, for the operative connection between both members, instead of the mechanical linkage, it is, of course, possible to use an electrically operated connection. Further, the selective setting of the formats may otherwise be carried out from the side of the finder. For this purpose, the actuator is changed in position as provided on the changeable viewfinder frame forming member. Also, this setting operation is made possible to perform by using a non-mechanical operating member.

Also, though, in the above-described embodiment, the knob 10d for altering the size of the picture frame is made locked by the recessed portions 22a and 22b provided in the inner surface of the back cover 22 so that after the back cover 22 has been closed, the frame size is not altered, this locking means may otherwise be formed provided that alteration of the frame size can be hindered in one roll of film. For example, either the changeable format forming member or the changeable viewfinder frame forming member is partly connected to the frame counter plate of the camera either mechanically or electrically. Besides this, any other form may be employed provided that alteration of the picture frame size is hindered during the use of the same film cartridge.

Also, though, in the above-described embodiment, the switch 30 for detecting the frame size is constructed with the contact members, this may otherwise be replaced by any other detecting means such as a photointerrupter. In this case, it is required that when the detecting means is rendered inoperative, the distance the film is advanced in each frame corresponds to the large frame size.

Also, though, in the above-described embodiment, alteration of the critical value for an alert to camera-shake in response to change of the size of the picture frame is reflected only to the display, it may be used for altering the cutoff time of the shutter or acted on other means.

Also, though, in the above-described embodiment, the size of the picture frame can be changed to only two values or the full and half sizes, the number of values to which the frame size can be changed may be increased.

As has been described above, according to the present invention, the various problems of the camera capable of changing the size of the picture frame can be eliminated, and the performance and manageability of this kind of camera are remarkably improved. This constitutes a great advantage of the invention.

What is claimed is:

1. A camera capable of changing the picture frame size, comprising:
    changeable picture frame forming means for changing the picture frame size;
    a finder device;
    finder state changeable means for changing the state of said finder device in response to a change of said picture frame size by said changeable picture frame forming means, said finder state changeable means constituting a unit together with said finder device; and
    fastener means for fixing said unit to a body of the camera, said fastener means being able to adjust the fixed position.

2. A camera according to claim 1, wherein said changeable picture frame size forming means includes means for changing the picture frame between the full size and the half size.

3. A camera according to claim 1, wherein said finder state changeable means includes viewfinder frame changeable means for changing the field of view of said finder device.

4. A camera according to claim 3, wherein said finder state changeable means includes screen means for 5. A camera according to claim 1, further comprising prohibiting means for prohibiting change of the picture frame size by said changeable picture frame forming means when the camera has been charged with a image recording.

6. A camera according to claim 1, further comprising:
    detecting means for detecting the set frame size by said changeable picture frame forming means; and
    an image recording medium fed amount setting means for setting the amount of fed image recording medium by one frame in response to said detecting means, said image recording medium amount setting means setting the amount of fed image recording medium by one frame to a value for a large picture frame size when said detecting means does not operate.

7. A camera according to claim 1, further comprising warning value changeable means for causing the warning value relating to camera-shake to change in response to the set picture frame size by said changeable picture frame forming means.

* * * * *

UNITED STATES PATENT AND TRADEMARK OFFICE
CERTIFICATE OF CORRECTION

PATENT NO. : 5,066,971  Page 1 of 4
DATED : November 19, 1991
INVENTOR(S) : TAKANORI KODAIRA It is certified that error appears in the above-identified patent and that said Letters Patent is hereby corrected as shown below:

COLUMN 1:

Line 4, "application" (second occurrence) should be deleted;
    Line 15, "wide" should read --width--;
    Line 16, "24 mm x 25" should read --24 mm x 35--;
    Line 17, "mm is" should read --mm format is--;
    Line 18, "well known" should read --well-known--;
    Line 31, "has" should read --have--;
    Line 37, "ever sold" should be deleted;
    Line 46, "which" should be deleted;
    Line 48, "make was high." should read --take.--;
    Line 54, "size But," should read --size.  But,--;
    Line 55, "is" should be deleted; and
    Line 67, "posal," should read --posal--.

COLUMN 2:

Line 17, "suffer" should read --suffer from--;
    Line 23, "convenational" should read --conventional--;
    Line 37, "the" should read --a--; and
    Line 68, "size" should read --size.--.

UNITED STATES PATENT AND TRADEMARK OFFICE
CERTIFICATE OF CORRECTION

PATENT NO. : 5,066,971                                    Page 2 of 4

DATED       : November 19, 1991

INVENTOR(S) : TAKANORI KODAIRA

It is certified that error appears in the above-identified patent and that said Letters Patent is hereby corrected as shown below:

COLUMN 3:

Line 43, "value" should read --values--.

COLUMN 4:

Line 17, "mountedon" should read --mounted on--;
    Line 65, "geared respectively." should read --geared portions, and fixedly mounted on shafts 16a and 17a, respectively.--;
    Line 66, "17a" should read --17a,--; and
    Line 67, "respectively" should read --respectively,--.

COLUMN 5:

Line 2, "tangular" should read --rectangular--; and
    Line 65, "control;" should read --control--.

COLUMN 6:

Line 43, "causes" should read --caused--; and
    Line 68, "driv" should read --drive--.

UNITED STATES PATENT AND TRADEMARK OFFICE
CERTIFICATE OF CORRECTION

PATENT NO. : 5,066,971   Page 3 of 4
DATED : November 19, 1991
INVENTOR(S) : TAKANORI KODAIRA It is certified that error appears in the above-identified patent and that said Letters Patent is hereby corrected as shown below:

COLUMN 7:

Line 1, "tutn" should read --turn--;
    Line 38, "FIG. 2(or" should read --FIG. 2 (or--;
    Line 57, "sec. wheer f" should read --sec. (where f--;
    Line 60, "toc amera-shake" should read --to camera-shake--; and
    Line 67, "photographgs" should read --photographs--.

COLUMN 8:

Line 25, "cotnrol" should read --control--;
    Line 35, "onthe" should read --on the--; and
    Line 41, "witch 37" should read --switch 37--.

COLUMN 9:

Line 8, "swich 30" should read --switch 30--;
    Line 18, "first chapter (i)" should read --section (i)--;
    Line 21, "fialure" should read --failure--;
    Line 39, "sreen" should read --screen--; and
    Line 54, "made" should be deleted.

UNITED STATES PATENT AND TRADEMARK OFFICE
CERTIFICATE OF CORRECTION

PATENT NO. : 5,066,971

DATED : November 19, 1991

INVENTOR(S) : TAKANORI KODAIRA

It is certified that error appears in the above-identified patent and that said Letters Patent is hereby corrected as shown below:

COLUMN 10:

Line 46, "for" should read --for changing the field of view of the finder.--;
    Line 50, "a" should read --an--;
    Line 51, "recording." should read --recording medium.--; and
    Line 58, "medium" should read --medium fed--.

Signed and Sealed this

Second Day of November, 1993

Attest:

BRUCE LEHMAN

Attesting Officer

Commissioner of Patents and Trademarks